J. B. DENHAM & G. VANCE.
CULTIVATOR.
APPLICATION FILED FEB. 15, 1913.
1,075,243.
Patented Oct. 7, 1913.
3 SHEETS—SHEET 3.
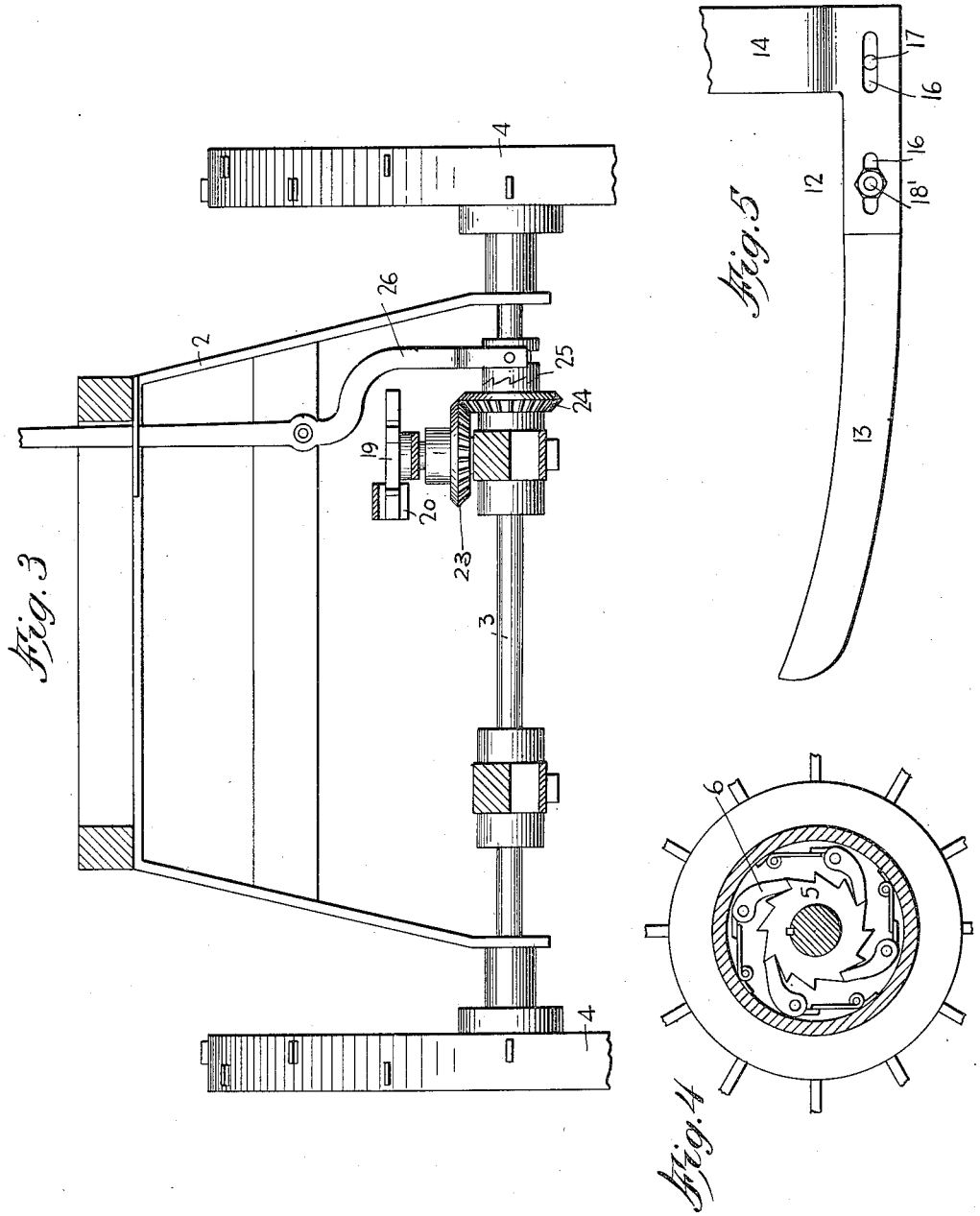
WITNESSES
INVENTORS
John B. Denham
Grover Vance
BY
ATTORNEYS

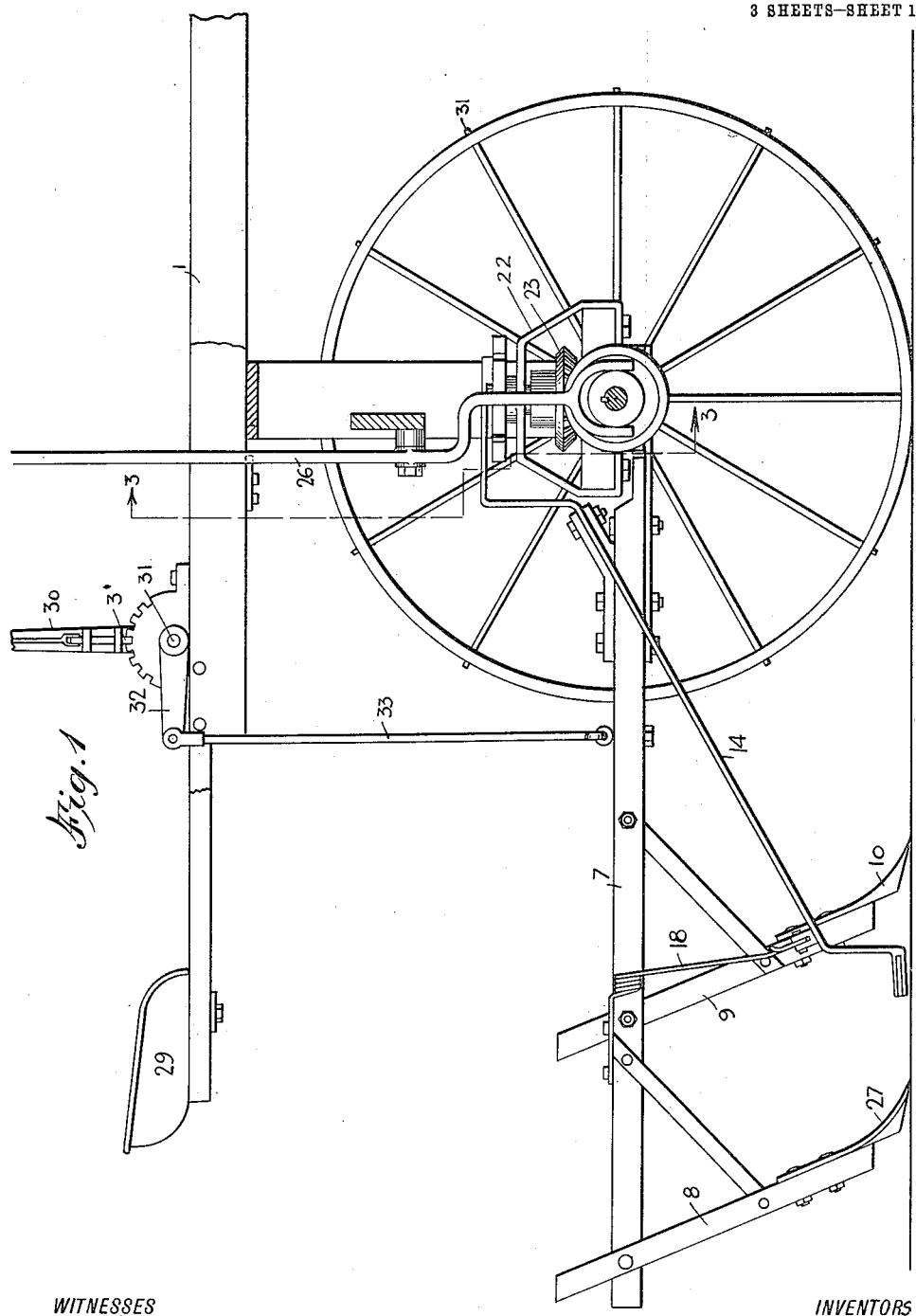

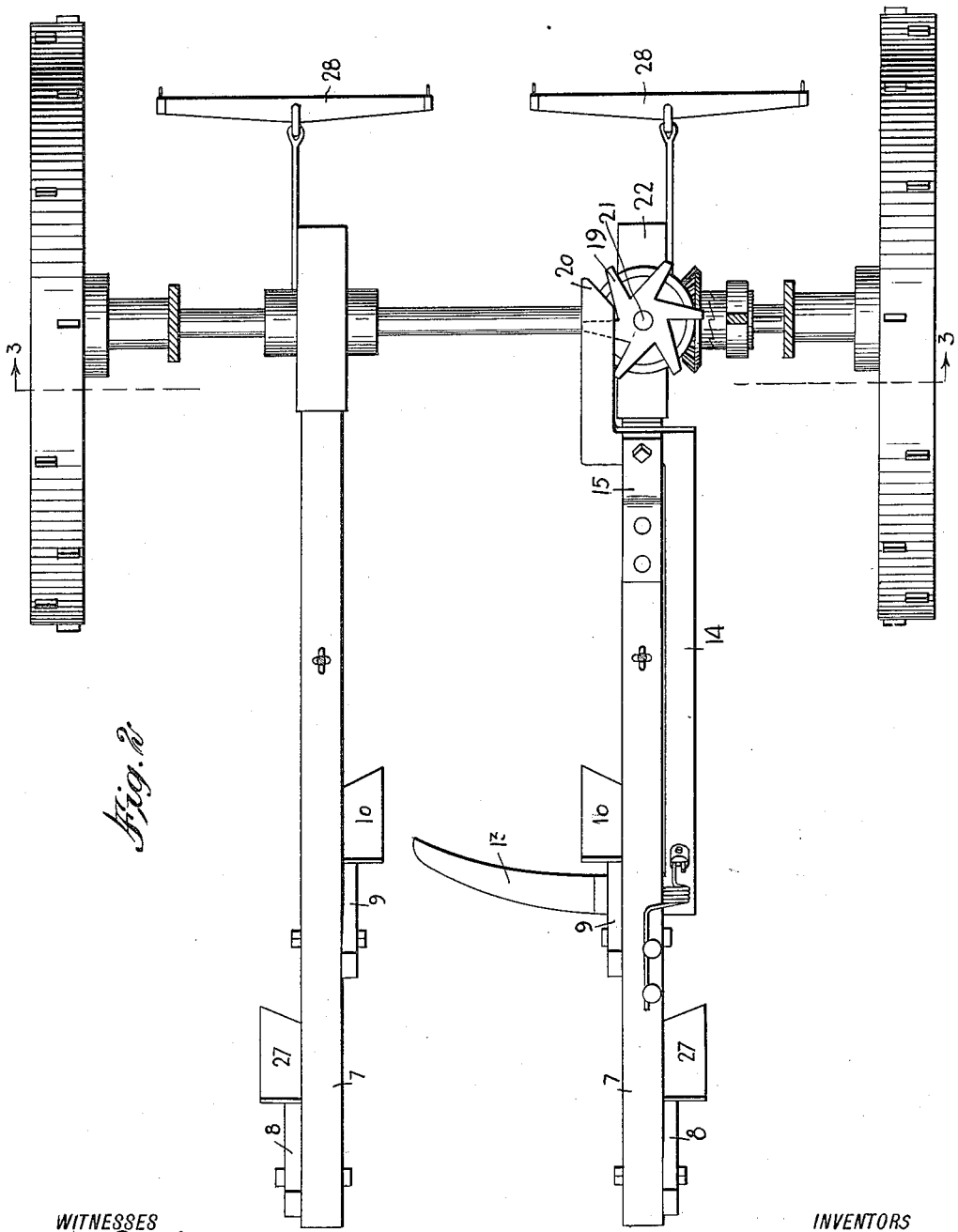

UNITED STATES PATENT OFFICE.

JOHN B. DENHAM AND GROVER VANCE, OF SANDFORD, INDIANA.

CULTIVATOR.

1,075,243.  Specification of Letters Patent.  Patented Oct. 7, 1913.

Application filed February 15, 1913. Serial No. 748,588.

*To all whom it may concern:*

Be it known that we, JOHN B. DENHAM and GROVER VANCE, both citizens of the United States, and residents of Sandford, in the county of Vigo and State of Indiana, have invented a new and Improved Cultivator, of which the following is a full, clear, and exact description.

This invention relates more particularly to that class of cultivators used for crops, such as corn or cotton, which are spaced in cross rows.

In the cultivation of crops of this nature, it has been customary heretofore to loosen the soil between the rows first in one direction across the field, and afterward, if the nature of the crop permitted, to plow or cultivate in a direction at right angles to the first, it being desirable to loosen the soil and destroy the weeds on all sides of the plants. This procedure necessitates going over the field twice to obtain the proper results and causes, therefore greater loss of plants by trampling of the horses.

The present invention contemplates overcoming the necessity of cultivating with the two operations, an object of the invention being to provide means whereby cultivation and destruction of undesirable growth may be performed between the rows of plants, both longitudinally and transversely, simultaneously.

A further object is to provide a cultivator which can be adjusted to cultivate crops the rows of which are spaced different distances from each other.

Other objects are to secure simplicity of construction and operation, and to obtain other advantages and results, as will be pointed out in the following description.

Referring to the accompanying drawings, in which like numerals of reference indicate the same parts throughout the several views, Figure 1 is a vertical sectional view of a cultivator embodying our invention, taken on a longitudinal plane spaced a distance in from the side wheel; Fig. 2 is a horizontal sectional view taken on a plane above the axle, looking down; Fig. 3 is a transverse sectional view taken on the broken line 3—3 of Figs. 1 and 2; Fig. 4 is a sectional view transversely through one of the hubs, showing the arrangement of ratchets therein; and Fig. 5 is a detail plan of a certain blade and a portion of the arm supporting the same.

In the specific embodiment of the invention illustrated in said drawings, the reference character 1 indicates the body or frame of the cultivator carried by means of an A-shaped yoke 2 upon an axle 3 rotatively mounted in the ends of the legs of said yoke. Wheels 4, 4 of any desired or requisite type are carried on the ends of said axle, and are preferably provided with a ratchet-and-pawl connection 5, 6 (see Fig. 4) for rotating the axle when the wheels are moving in a forward direction and allowing the axle to remain stationary when the wheels are moving rearwardly, as will readily be appreciated by those familiar in the art.

Supported by the axle 3 and projecting rearwardly therefrom is a pair of substantially horizontal plow beams 7, which are preferably adapted to be adjusted in spaced relation longitudinally upon the axle. Each of these plow beams 7 has mounted adjacent the rear end thereof or end away from the axle, a depending bracket or leg 8 preferably secured firmly upon the outer side of the beam 7 and sloping forwardly downward. Similar or front brackets 9 are secured also to each of said plow beams intermediate of the axle and the bracket 8 above described and preferably arranged upon the inner sides of the plow beams 7. Each of these forward brackets 9 carries a plow 10 at the lower end thereof with the shovel or blade adapted to turn a furrow outwardly away from the opposite plow. Obviously the pair of these forward plows 10 turn longitudinal furrows away from each other and leave a balk or ridge therebetween, and it is upon this balk or ridge that the row of spaced apart plants are growing as the cultivator is operated.

In order to loosen the ground and uproot any growth between the spaced apart plants on the balk, we provide a swinging scythe 12 adapted to swing intermittently into the balk and thereby loosen the ground at intervals longitudinally thereof. The scythe as herein disclosed comprises a blade 13 carried by a snathe or arm 14 projecting forwardly upward of the cultivator and pivoted in a suitable bracket 15 on one of the plow beams 7 above described, and so arranged that the blade is adapted to be swung transverse to the forward movement of the cultivator close behind the forward plows 10 between their paths of movement, and in substantially a horizontal plane through their points. Furthermore said blade is preferably held longitudinally adjustable on said snathe by any suitable means such as by slots 16, 16, in the snathe, in one of which engages a pin 17 on the blade and in the other of which is a bolt 18'. The blade is normally held in its inward or cutting position between the plows 10, 10 by means of a spring 18 secured at one end adjacent the blade end of the snathe and fastened at its other end to the plow beam 7, but obviously other equivalent means might be employed to attain the same result. For intermittently retracting said blade from such normal position out of the path intermediate of the plows 10, 10, we provide a horizontally arranged trip 19 over the axle and shown in this instance to be a ratchet-like wheel the teeth of which engage a depending projection 20 on the forward end of the snathe in front of its pivotal support to swing the same out of its path of rotation thereby swinging the blade out of its normal position. As the tooth passes out of engagement with the depending projection 20 on the snathe, however, said snathe and blade swing back to normal position by virtue of the spring above described, to be again swung therefrom by the next tooth on the trip 19 and so on. We do not wish to be understood as restricting ourselves, however, to a trip having any particular number of teeth as it will be evident that by substituting a trip having a different number of teeth a corresponding change in the number of swings given the scythe in a given distance of travel of the cultivator will be effected. It is therefore preferable to have a plurality of trips having varied numbers of teeth, any one of which trips may be substituted for the one shown, whereby the proper interval of swing given the scythe may be regulated to correspond to any particular spacing between the plants on the balk. For illustrative purposes we have shown this trip mounted upon a vertical shaft 21 supported adjacent its upper end in a frame 22 and having fixed adjacent its lower end a downwardly facing bevel gear 23 meshing with a bevel gear 24 loose upon the axle 3 and adapted to be driven therefrom through a clutch 25 keyed upon the axle. A lever 26 is shown pivoted to the body 1 for throwing this clutch in and out as desired.

It will be noted that the brackets or legs at the end of the plow beams 7 are relatively spaced farther apart than the forward brackets or legs 9 so that plows 27 affixed thereto and dished toward the center will not only tend to loosen the soil a greater width but will have also a tendency to refill the furrows made by the first or forward plows behind the swinging blade or scythe.

The apparatus will be provided with any usual or preferred means for hitching horses thereto, as the whiffletrees 28, and a seat 29 for the driver.

Located adjacent the driver's seat 29 is a pivoted lever 30, the shaft 31 of which carries an arm 32 pivotally connected by means of a link 33 to one of the plow beams 7, whereby, by rocking the lever 30, the plow beams may be raised or lowered, as desired, and by means of a suitable latching device 34, the plow beams 7 may be held at varying distances from the ground.

Having thus described our invention, what we claim as new and desire to secure by Letters Patent is:

1. In a wheeled cultivator, a beam, an arm pivoted to the forward part of the beam and extending rearwardly, a blade extending at right angles from the free end of the arm to cut transversely of a plant row, a spring normally holding the blade in its operative position, and means for operating said arm.

2. In a cultivator, a wheel supported frame, a beam, an arm pivoted to the forward end of the beam and extending rearwardly, an adjustable blade secured to and extending at right angles from the free end of the arm to cut transversely of a plant row, a spring normally holding the blade in its operating position and means for reciprocating said arm.

3. In a cultivator, a wheel supported frame, a beam secured to and extending rearwardly from the axle, an arm pivoted to the forward end of the beam on an approximately vertical pivot, said arm extending rearwardly, a blade secured to and extending at right angles from the free end of the arm, a spring having one end secured to the beam, and its other end to the said arm, and means for reciprocating said arm.

4. In a cultivator, a wheel supported frame, a cultivator beam secured to the axle, a pivoted and spring pressed arm mounted on the beam, the arm having its forward end offset and provided with a depending projection at the end of the offset portion, a blade secured to the free end of the arm and projecting laterally therefrom, and a ratchet-like wheel engaging the projection of said arm to reciprocate the same.

In testimony whereof we have signed our names to this specification in the presence of two subscribing witnesses.

JOHN B. DENHAM.
GROVER VANCE.

Witnesses:
  W. H. VOLKERS,
  MARION OWENS.

Copies of this patent may be obtained for five cents each, by addressing the "Commissioner of Patents, Washington, D. C."